Figure 1:
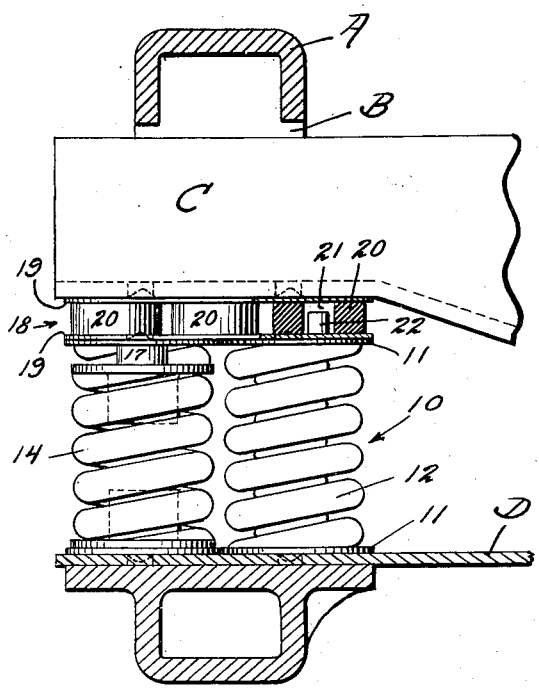

April 24, 1934.   T. H. SYMINGTON ET AL   1,956,108
COMBINED SPRING AND ABSORPTION MEANS
Filed Feb. 24, 1930

Inventor
Thomas H. Symington &
Percy R. Drenning
By John Milton Jester
Attorney

Patented Apr. 24, 1934

1,956,108

UNITED STATES PATENT OFFICE 1,956,108

COMBINED SPRING AND ABSORPTION MEANS

Thomas H. Symington and Percy R. Drenning, Baltimore, Md., assignors to T. H. Symington & Son, Inc., Baltimore, Md., a corporation of Maryland Application February 24, 1930, Serial No. 430,870

9 Claims. (Cl. 267—4)

The invention relates to railway car truck spring mechanism and has special reference to springs of the helical type arranged in groups or nests.

It is well known that the present various standard types of truck springs consist of groups of helical springs, either single or double, arranged in symmetrical relation and having the same travel, free height and capacity. Owing to the large carrying capacity of modern freight cars it is apparent that the load upon and deflection of the truck springs varies through a wide range depending upon whether the car is empty, lightly loaded or fully and heavily loaded. Springs which will act properly under no load or light load conditions go solid under heavy load conditions and springs capable of operating efficiently under heavy load conditions have remarkably little cushioning effect under light load conditions. Furthermore as the ordinary springs are all of the same character, that is to say in so far as travel, free height, etc. are concerned, they all have the same period of vibration such as is brought about by passage of the car wheels over the rail joints, it being known that when the natural period of vibration of the springs is synchronized with the passage of the wheels over the rail joints, the vibration in the springs builds up and at certain speeds the expansive and compressive movement become so great that upon the recoil the truck bolster is frequently thrown clear off the springs.

In the co-pending application of Percy R. Drenning for Snubbed truck springs, filed February 6, 1930, Serial No. 426,385, there is disclosed an arrangement of helical springs wherein one or more of the springs in the nest is held under a certain degree of initial compression in order that the springs will come successively into play in accordance with progressive increase in the load. In the co-pending application of Thomas H. Symington for patent for Shock absorbing shim for trucks, filed September 20, 1929, Serial No. 394,023, there is disclosed a cushion or buffer formed as one or more rubber blocks confined between metal plates and arranged in series with and either upon the top or bottom of the spring nest.

The object of the present invention, generally stated, is to provide a combination of a nest of helical truck springs, one or more of which are snubbed or held under an initial predetermined compression, with a yieldable auxiliary cushion shim so as to obtain a smoother action under extremely light load conditions and to make it possible to use springs of greater capacity for taking care of heavy loads.

Another object of the invention is to provide a bolster supporting mechanism comprising the combination of springs which will come into play at progressively varying loads, and a resilient or cushioning shim in series therewith, the combination providing for a plurality of brakes or abrupt changes in direction of the spring curve so that under any and all load conditions and at all speeds any tendency of the assembly to build up vibration, resulting in serious jiggle, will be checked and in some instances doubly checked, one checking action being brought about by the coming into service of the successively preliminarily compressed springs and the other being brought about by the action of the cushioning shim.

An additional object of the invention is to provide a combination of this character which will be simple and inexpensive to make, as easy to install as any other type of spring device and which will moreover be positive in action, efficient and durable in service, and a general improvement in the art.

Figure 2:
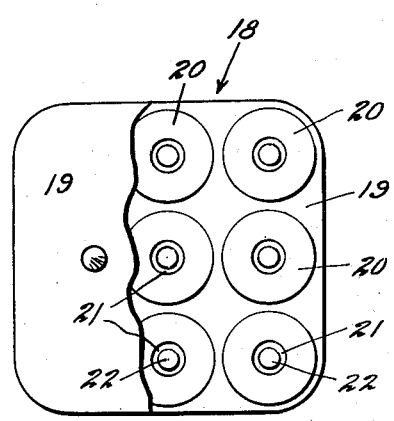
Figure 4:
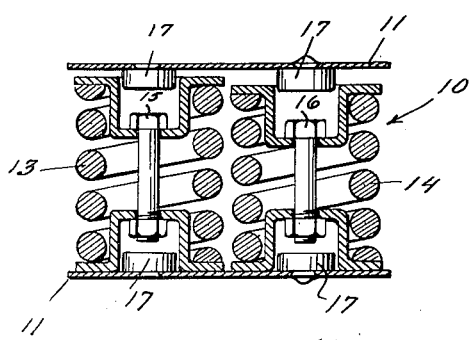
Figure 3:
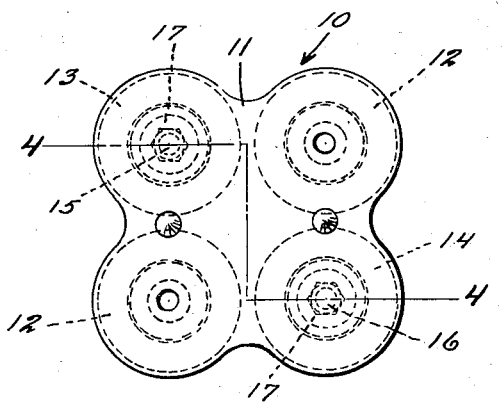

To the attainment of the foregoing and other objects and advantages, the invention preferably consists in the details of construction and the arrangement and combination of parts to be hereinafter more fully described and claimed, and illustrated in the accompanying drawing in which:

Figure 1 is a vertical cross section through a truck side frame, showing the bolster therein supported upon our combined mechanism, Figure 2 is a plan view of the shim device with a portion of the top plate broken away, Figure 3 is a plan view of the spring nest, Figure 4 is a vertical cross section through the spring assembly taken on the line 4—4 of Figure 3.

Referring more particularly to the drawing, the letter A designates a portion of a truck side frame having the usual window opening B therein into which extends the truck bolster C. The ordinary spring plank is shown at D.

In carrying out our invention we provide a spring nest or cluster 10 here disclosed as including upper and lower spring caps 11 between which are helical springs 12 which are preferably of the Norfolk and Western type and of standard height and travel. The capacity of these and other springs to be described of course depends upon the character of the car. The cluster also includes springs 13 and 14 which may be of the single or double coil type, as preferred, and which are preferably arranged diagonally in the nest. These springs 13 and 14 are intended to be snubbed, that is held under a certain predetermined initial or preliminary compression, the free height being naturally consequently reduced. This desired effect is easily accomplished by means of bolts 15 and 16, or other equivalent tie means passing through depressed guide portions 17 in the cap and extending axially of the springs 13 and 14. While it is easily possible that one snubbed spring might be used or that two might be provided compressed to the same extent, we prefer that the spring 14 be initially compressed to a greater extent than the spring 13 and that therefore the springs 13 and 14 will have progressively less height as compared with each other and the standard springs. The exact degree of initial compression and the reduction in the height are matters which depend upon the specific character of the equipment with which our device is to be used. This arrangement is disclosed in said co-pending application of Percy R. Drenning mentioned above.

Located in series with this spring cluster is an auxiliary or additional cushion means indicated generally at 18 and located either on the top or at the bottom of the spring nest or cluster in direct contact with either the upper or lower spring cap, this being immaterial. Naturally this cushioning means may be as disclosed in said co-pending application of Thomas H. Symington mentioned above and preferably comprises metal plates 19 between which are rubber blocks or pads 20 intended to have a limited degree of compression and therefore represented as formed with openings 21 within which are pins or other stop elements 22 of less height than the thickness of the rubber blocks. Any desired means may of course be provided for securing the blocks to the metal plates and in fact there may be numerous variations in detail as disclosed in said co-pending application. The spring caps and the metal plates of the shim device may be and preferably are provided with the usual projections designed to be received within recesses or holes in the side frame and spring plank so that the entire assembly will be maintained in proper position in the window openings of the truck. However, this is another immaterial detail which does not affect the broad principle involved herein.

Assuming that the spring cluster embodies two of the initially compressed or snubbed helical springs and that the shim is arranged in series with the spring nest, it is apparent that at all times, but especially under extremely light load conditions, the rubber blocks of the shim device will operate to take up a certain amount of the shocks and jars incident to travel of the wheels over rail joints, etc. Ordinary light loads are adequately supported by the unsnubbed or standard springs in the cluster. If the load is being supported on these standard springs and there is any tendency toward the development of vibration or jiggle, such as results from synchronization or the passage of the car wheels over rail joints with the natural period of vibration of the springs, the additional deflection or compression of the standard springs will cause the spring caps to engage against the snubbed springs 13 which will oppose an added resistance and abruptly check the jiggling tendency. As the load is increased the springs 13 are energized and, together with the springs 12 and the shims, will carry it, the springs 14 being then inactive and remaining in reserve to oppose their resistance in the event that the springs 12 and 13 are excessively deflected as the result of a jiggling tendency. Of course the very heaviest load is sustained by all the springs. As certain of the springs are held under initial compression it is clear that they will naturally have a different period of vibration from those which are unrestrained or which are not subjected to the confining action of the bolts 15 and this feature is of great assistance and benefit in breaking up the vibration which becomes dangerous when synchronized with passage of the wheels over the rail joints. At any and all times the rubber blocks of the cushioning shim perform their function and it will be consequently clear that the riding qualities of the truck under all conditions should therefore be materially improved.

While we have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, we claim:

1. A spring mechanism for supporting a bolster in the side frame of a railway truck, comprising the combination of a spring nest including spring caps and a plurality of coil springs arranged side by side therebetween, means including individual caps for maintaining certain of said springs under initial compression whereby the normal free height thereof will be reduced and whereby they will possess stored-up energy, and a rubber cushioning device engaged against one of the first named caps and having its own cap and acting in series with the springs.

2. A spring mechanism for supporting a bolster in the side frame of a railway truck, comprising the combination of a spring nest including a plurality of coil springs arranged side by side, means for maintaining certain of said springs under initial compression whereby the normal free height thereof will be reduced and whereby they will possess stored-up energy, a rubber cushioning device engaged against the nest and acting in series with the springs therein, the nest including end caps, and said rubber cushioning device lying against one of said caps and being coextensive therewith.

3. A spring mechanism for supporting a bolster in the side frame of a railway truck, the bolster having openings therein, comprising the combination of a spring nest including a plurality of coil springs arranged side by side, end caps for the nest, individual caps for certain of the respective springs connected by means for maintaining the springs under initial compression, said individual caps being in addition to the first named caps, and a cushioning device acting in series with the springs and comprising rubber means disposed against the upper one of said first named caps and carrying its own cap having projections adapted to enter the openings in the bolster.

4. A spring mechanism for supporting a bolster in the side frame of a railway truck, the truck including a spring plank, the spring plank and the bolster being formed with vertically alined openings, comprising the combination of a spring nest including a plurality of coil springs arranged side by side and interposed between caps having projections, and an auxiliary cushioning means acting in series with the springs and comprising rubber pad means disposed against one of said caps, and an additional cap for the rubber pad means having projections thereon adapted to enter said openings.

5. A spring mechanism for supporting a bolster in the side frame of a railway truck, the truck including a spring plank, the spring plank and the bolster being formed with vertically alined openings, comprising the combination of a spring nest including a plurality of coil springs arranged side by side and interposed between caps having projections, and an auxiliary cushioning means acting in series with the springs and comprising rubber pad means disposed against one of said caps, an additional cap for the rubber pad means having projections thereon adapted to enter said openings, and means between said last named cap and the adjacent first named cap for limiting compression of the pad means.

6. A spring mechanism for supporting a bolster in the side frame of a railway truck, comprising the combination of a spring nest including a plurality of coil springs arranged side by side, a rubber cushioning device engaged against the nest and acting in series with the springs therein, the nest including end caps, and said rubber cushioning device lying against one of said caps and being substantially coextensive therewith.

7. A spring mechanism for supporting a bolster in the side frame of a railway truck, comprising the combination of a spring nest including a plurality of coil springs arranged side by side, a rubber cushioning device engaged against the nest and acting in series with the springs therein, the nest including end caps, and said rubber cushioning device lying against one of said caps and being provided with its own cap.

8. A spring mechanism for supporting a bolster in the side frame of a railway truck, comprising the combination of a spring nest consisting of a plurality of coil springs arranged side by side, upper and lower caps common to all of the springs, a resilient non-metallic cushioning device located exteriorly of the nest and having its own separate cap and acting in series with said springs.

9. A spring mechanism for supporting a bolster in the side frame of a railway truck, comprising the combination of a spring nest including upper and lower main caps, a plurality of helical coil springs arranged side by side and adapted to have their ends cooperate with said main caps, individual caps for the springs, means on the main caps cooperating with the individual caps for preventing lateral displacement of the springs in any direction, a yieldable non-metallic shim disposed against the outer face of one of said main caps, and a separate cap for said shim.

THOMAS H. SYMINGTON.
PERCY R. DRENNING.